United States Patent
Birk

(10) Patent No.: US 8,878,376 B2
(45) Date of Patent: Nov. 4, 2014

(54) WIND TURBINE WITH ADDITIONAL ROTOR MOMENT OF INERTIA AND A METHOD FOR CONTROLLING A WIND TURBINE WITH ADDITIONAL ROTOR MOMENT OF INERTIA

(71) Applicant: Envision Energy (Denmark) ApS, Silkeborg (DK)

(72) Inventor: Jens Birk, Silkeborg (DK)

(73) Assignee: Envision Energy (Denmark) ApS, Silkeborg (DK)

( * ) Notice: Subject to any disclaimer, the term of this patent is extended or adjusted under 35 U.S.C. 154(b) by 0 days.

(21) Appl. No.: 13/668,903

(22) Filed: Nov. 5, 2012

(65) Prior Publication Data
US 2013/0119663 A1 May 16, 2013

(30) Foreign Application Priority Data

Nov. 4, 2011 (DK) .................................. 2011 70605
Jul. 9, 2012 (DK) .................................. 2012 70416

(51) Int. Cl.
*F03B 13/00* (2006.01)
*F03D 7/02* (2006.01)

(52) U.S. Cl.
CPC ................ *F03D 7/02* (2013.01); *F03D 7/0284* (2013.01); *Y02E 10/723* (2013.01); *Y02E 10/725* (2013.01); *Y02E 10/721* (2013.01)
USPC .............................................. 290/43; 290/54

(58) Field of Classification Search
USPC .......................... 290/43, 44, 54, 55; 416/145
See application file for complete search history.

(56) References Cited

U.S. PATENT DOCUMENTS

| | | | | |
|---|---|---|---|---|
| 2,427,586 A | * | 9/1947 | Biermann | 416/139 |
| 2,451,541 A | * | 10/1948 | Doman | 416/145 |
| 2,576,105 A | * | 11/1951 | Childs | 416/31 |
| 4,291,235 A | * | 9/1981 | Bergey et al. | 290/55 |
| 4,302,152 A | * | 11/1981 | Jensen | 416/18 |
| 6,607,359 B2 | * | 8/2003 | von Flotow | 416/229 R |
| 6,914,339 B2 | * | 7/2005 | Rios-Vega | 290/1 R |
| 7,581,929 B2 | * | 9/2009 | Carvalho | 416/145 |
| 7,586,216 B2 | | 9/2009 | Li et al. | |
| 7,811,063 B2 | * | 10/2010 | Bonnet | 416/229 R |
| 7,978,445 B2 | * | 7/2011 | Ritter | 361/18 |

(Continued)

FOREIGN PATENT DOCUMENTS

| CN | 101569086 A | 10/2009 |
|---|---|---|
| DE | 10 2006 030 167 A1 | 1/2008 |
| DE | 10 2009 021 651 A1 | 11/2010 |
| EP | 1 783 366 A1 | 5/2007 |

(Continued)

*Primary Examiner* — Tulsidas C Patel
*Assistant Examiner* — Charles Reid, Jr.
(74) *Attorney, Agent, or Firm* — Roberts Mlotkowski Safran & Cole, P.C.; David S. Safran

(57) ABSTRACT

This invention relates to a wind turbine having an additional mass each placed between a mounting end and a free end of at least two rotor blades. This invention further relates to a method for controlling a wind turbine with a pitch system for pitching a blade in a pitch angle and with blades with a mass for increased inertia, which wind turbine is operated in a normal operation mode in which a generator has a generator speed at a generator torque, and which wind turbine is to remain electrically coupled to a grid during a low voltage condition and with supplied current specifications, torque reference, power references, or according to a grid code.

11 Claims, 9 Drawing Sheets

(56) References Cited

U.S. PATENT DOCUMENTS

| | | | | |
|---|---|---|---|---|
| 8,262,363 | B2* | 9/2012 | Gerber et al. | 416/229 R |
| 2007/0024060 | A1* | 2/2007 | Bacon | 290/55 |
| 2010/0107621 | A1* | 5/2010 | Garvey | 60/327 |
| 2010/0119370 | A1* | 5/2010 | Myhr | 416/39 |
| 2011/0134574 | A1 | 6/2011 | Ritter | |
| 2012/0107116 | A1* | 5/2012 | Obrecht | 416/1 |

FOREIGN PATENT DOCUMENTS

| | | |
|---|---|---|
| EP | 2362091 A1 * | 8/2011 |
| KR | 2010-0128200 A | 12/2010 |
| WO | 2004/011801 A1 | 2/2004 |
| WO | 2006/007838 A1 | 1/2006 |
| WO | 2008/031434 A2 | 3/2008 |
| WO | 2010/085988 A2 | 8/2010 |
| WO | WO 2010085988 A2 * | 8/2010 |

* cited by examiner

WIND TURBINE WITH ADDITIONAL ROTOR MOMENT OF INERTIA AND A METHOD FOR CONTROLLING A WIND TURBINE WITH ADDITIONAL ROTOR MOMENT OF INERTIA

BACKGROUND OF THE INVENTION

1. Field of the Invention

This invention relates to a wind turbine comprising:

a wind turbine tower with an upper end and a lower end, which lower end is provided on a wind turbine foundation;

a wind turbine nacelle provided at an upper end of said tower;

a hub provided at said nacelle;

at least two wind turbine rotor blades each with a mounting end and a free end, which mounting end is mounted on the hub for rotation in a rotational plane around an axis that is extended by shaft coupled to a generator or a gearbox;

grid connection for feeding produced electricity from the generator to a grid, which grid connection has voltage detection means for detecting changes in the voltage on the grid;

at least two masses each placed between the mounting end and the free end of at least two rotor blades.

2. Description of Related Art

This invention further relates to a method for controlling a wind turbine with a pitch system for pitching a blade in a pitch angle and with blades with a mass for increased inertia, which wind turbine is operated in a normal operation mode in which a generator has a generator speed at a generator torque, and which wind turbine is to remain electrically coupled to a grid during a low voltage condition and with supplied current specifications, torque reference, power reference, or according to a grid code; the method comprising the steps of:

detecting a low voltage condition with voltage detection means, which voltage detection means after detecting a low voltage condition send a request for:

a rotor de-rate procedure in a wind turbine controller; which de-rate procedure includes:

LVRT pitching the rotor blades to an LVRT pitch angle;

detecting a normal voltage condition with voltage detection means, which normal voltage condition is within a voltage range of the normal voltage condition; which voltage detection means after detecting a normal voltage condition send a request for:

normal operation mode of the wind turbine; which normal operation mode has an initial phase where:

the generator torque or power is increased to a desired torque reference or power reference, and pitching the rotor blades from the LVRT pitch angle to a normal or freely controlled pitch angle.

In electric power generation and in particularly in the field of electric power generation by wind turbines, the electric power generation as a unit is required to interact or interface with a grid. This also means that the electric power generator is, and this is defined, required, requested or otherwise determined mainly by regulations, that the electric power generator is capable of adjusting or responding the changes on the grid.

In general the grid is defined as a transmission network that interconnects sources of electric power generators and sinks of electric power consumptions. The number of power sources, such as power stations, is often outnumbered by the number of power sinks, being individual households, commercial or industrial enterprises, public facilities or utilities.

In principle a grid can also be a so-called stand-alone-system with just one electric power generator as the source and just one electric power consuming unit as a sink.

Hence an electric power generator is a single unit that interacts with other sources or sinks also connected to the same grid.

The grid code sets requirements for grid connections of producers e.g. wind turbines for how to react to certain events on the grid.

As such the interaction between a power producing unit, or for that matter a power drawer unit, i.e. the connectees and the grid operator, is determined by a code determining and defining the grid. This code is the grid code.

Of technical importance are the voltage on the grid side and the voltage on the connectees side.

When the voltage on the grid side is normal, a wind turbine connected to the grid is designed to operate and be connected to the grid within a certain voltage range of the normal voltage condition. That is the wind turbine will rotate at a certain speed and be controlled to generate power within the range of the normal voltage conditions.

However, at times there is change of voltage on the grid. One such event is a so-called Low Voltage (LV) event. During such LV-event the wind turbine needs to be able to respond and act to stay connected to the grid.

Left uncontrolled, a LV-event will result in the rotor to increase its rotational speed; to over speed.

One way to reduce or eliminate the effect of a LV-event is to reduce the rotational speed of the rotor of the wind turbine to reduce or eliminate the over speed.

One solution is to brake the rotor mechanically to avoid over speed.

Another solution is to have an electric power generator system that includes a brake chopper, which brake chopper will simply burn energy in a dump, such as a resistor, thereby reducing the rotational speed of the rotor.

Brake choppers are know from patent applications, such as US 2007/0279815 A1 which corresponds to U.S. Pat. No. 7,586,216 B2, in which a brake chopper for de-energizing the generator in the wind turbine is disclosed.

Another example is disclosed in patent application WO 2010/085988, in which a method for allowing a wind turbine to remain electrically connected to a grid during a low voltage event is described. The method described relies on boosting a rotor current of the synchronous generator in response to the detected low voltage event.

The electrical brake system disclosed adds complexity and thereby requires extra resources during production and operation of the wind turbine.

Furthermore, the requirements of larger wind turbines increase the need for larger brake systems.

A person skilled in the art of making blades for a wind turbine has traditionally been occupied with making the blade lighter and stronger, whilst having the required flexibility. As the desire for making wind turbines even larger, the need for blades, that are even lighter, continues.

To such skilled person in the art, the optimal or ideal blade for a wind turbine is considered a shell and optimally just a skin shell forming a surface with the desired aerodynamically properties and the structural stability.

Likewise, the designer and producer of wind turbines will ideally ask for such ideal blade.

Over time blades for wind turbines have developed from being made of wood and with solid profiles, over blades made of glass fibres with hollow profiles towards carbon fibre blade structures.

Over the same time development systems and controls for operating a wind turbine with such optimised blades have been developed. Efforts to compensate for abnormal operation, including emergency operation have been devised as add-ons systems, elements usually placed in the hub, the tower or on the foundation or even adjacent from the wind turbine.

From International Patent Application Publication WO 2004/011801 A1 it is known to have movable masses arranged in the rotor blades in order to adjust the moment of inertia in relation to increase in wind speed. The solution mentioned in International Patent Application Publication WO 2004/011801 A1 concerns masses that are moved between different positions inside a wind turbine blade according to certain conditions as they appear. Moving said masses can be done in various ways with mechanical or electric motive elements.

WO 2004/011801 A1 does not teach how to control a wind turbine having blades with a length of e.g. 35 meters or more and a weight of e.g. 23000 kg or more during a low voltage ride through.

Instead it teaches how to increase the moment of inertia during high wind speeds by moving masses towards the tip of the blades and thus to accumulate kinetic energy in the rotor. Then during lower wind speeds the masses are moved towards the centre of the rotor in order to have a lower moment of inertia.

A solution as mentioned might be working when talking about rather small wind turbines with rather short and light wind turbine blades. In order to be able to change the moment of inertia in a modern wind turbine blade having a length of e.g. 35 meters or more and a weight of e.g. 23000 kg or more, it is quite a mass, for example several 1000 kilograms that need to be operated in each blade. Such a heavy mass is simply a problem to move between different positions in a blade according to the wind speed.

A similar solution is disclosed in U.S. Patent Application Publication US 2012/0107116 A1 which discloses a floating wind turbine with two moveable masses provided in each wind turbine blade in an elongated cavity. It teaches that the masses are designed to dampen the oscillating movement of the wind turbine structure and that the weight is determined based on the movement of the structure, such as 50 or 200 kilograms. Such a mass would not be suitable for changing the inertia of large and heavy modern wind turbine blade as mentioned above.

SUMMARY OF THE INVENTION

An object of this invention is to disclose a wind turbine and configuration of such wind turbine that eliminates the need of a brake chopper.

Another object of this invention is to disclose a method for operating a wind turbine without a brake chopper during a fault on the grid.

A further object of this invention is to disclose a wind turbine and/or a method for operating such wind turbine which will require a brake chopper or a brake system of reduced size.

An object of the invention is achieved by a wind turbine comprising:

a wind turbine tower with an upper end and a lower end, which lower end is provided on a wind turbine foundation;

a wind turbine nacelle provided at an upper end of said tower;

a hub provided at said nacelle;

at least two wind turbine rotor blades each with a mounting end and a free end, which mounting end is mounted on the hub for rotation in a rotational plane around an axis that is extended by shaft coupled to a generator or a gearbox;

grid connection for feeding produced electricity from the generator to a grid, which grid connections has voltage detection means for detecting changes in the voltage on the grid;

at least two masses each placed between the mounting end and the free end of at least two rotor blades, where said wind turbine comprises at least two wind turbine rotor blades each with a blade weight and a blade length of at least 35 meters between the mounting end and the free end, where each mass is between 10% and 40% of blade weight of each rotor blade.

Thereby the masses will increase the inertia of the rotor as compared to a rotor without the additional masses. During a low voltage event the grid will not provide a normal resistance or brake to the rotor via the generator and without the extra inertia, the rotor would start to rotate with a higher rotational speed, it will over speed, and possibly get out of control or to cause damage on components in the wind turbine.

According to this invention, the increased inertia of the rotor will reduce the rotational speed increase and reduce or even prevent such over speed.

As a consequence and compared to prior art, where wind turbines use that blades are designed to be as light as possible and grid faults are handled by a brake chopper, a turbine according to the invention is a wind turbine where the brake chopper is redundant and consequently a wind turbine can be produced with fewer elements at lower costs during production as well as operation.

This is contrary to prior art where a brake is used to increase the torque on the shaft, the de-rating according to the invention is due to the increased inertia of the blades.

As such, a partial-pitch wind turbine disclaiming a brake system or a brake chopper is disclosed.

It is understood that the masses can be placed as a continuum or discretely on each blade but balanced, so that the centre of gravity in the rotational plane co-insides with the axis of the rotor. Thereby not introducing any loads on the turbine during rotation.

In principle an additional mass can be added as a continuum on one blade and as discrete masses on another blade.

In case of discrete masses the inertia is determined as the sum of each mass multiplied by the squared radial distance from the axis. For a rotor with V symmetrically angular spaced blades and i-additional masses $m_i$ placed at an radii $r_i$, the additional rotor moment of inertia $I_m$ is $$I_m = n m_i r_i^2 V.$$

Generally the summation is in the continuum replaced by integration.

According to this invention, the wind turbine is special in that the rotor blade has an inner blade section and an outer blade section separated by a pitching system, that is located between the mounting end and the free end and configured to pitch said outer blade section relative to said inner blade section, which pitching system has a weight and radial extent no more than the weight and radial extend of a mass. Such a wind turbine is known as a partial-pitch wind turbine, and such a pitching system includes a pitch bearing. Such an embodiment of the invention is a wind turbine with two partial pitch blades without a brake chopper.

According to an embodiment of the invention, the wind turbine is special in the masses are placed with a centre of gravity that, when projected onto the rotational plane coincides with the axis.

Thereby the rotor is balanced and no undue mechanical loads are on the wind turbine. The person skilled in the art will be able to distribute masses according hereto.

It is noticed that according to the invention, the wind turbine is special in that each mass is between 10% and 40% of blade weight of each rotor blade.

Thereby the masses allow for an adjustment of the moment of inertia of the rotor according to an LV event according to a particular grid code.

According to an embodiment, the blade is configured to receive a variable mass, so that the moment of inertia of the rotor can be varied and matched to handle LV-events according to different grid codes.

In cases where the grid code defines LV-events that are smaller will require larger moments of inertia.

It is understood that each mass increase of each blade would otherwise have been unnecessary.

According to an embodiment of the blade, the blade has means for receiving such additional masses.

According to an embodiment of the invention, the wind turbine is special in that each mass radial extends no more than 10% of the blade length of each rotor blade, preferably no more than 5%.

Thereby each blade can have discrete masses installed and positioned in the blade.

According to an embodiment of the invention, each wind turbine blade has means for positioning, adjusting and/or fixing a mass radially in the blade. Complementary, each mass has means for positioning, adjusting and/or fixing the mass in a blade.

According to an embodiment of the invention, each blade has sections adapted to be closed sealed and filled with a mass that can be a fluid, such as water, antifreeze liquid or particles, such as sand or metal pieces. Complementary, each mass is a fluid, such as water, antifreeze liquid or oil. Likewise each mass is lot of particles, such as sand or metal pieces, such as lead balls.

According to an embodiment of the invention, the wind turbine is special in that further to the pitching system; at least an additional sub-mass is placed in the blade to constitute a total mass.

Thereby a pitching system can be installed as required and supplementary or additional masses, here termed sub-masses, can be installed as disclosed. This results in a moment of inertia of the rotor as required thereby enabling the wind turbine to handle a low voltage event without harmful over speed.

According to an embodiment of the invention, the wind turbine is special in that the wind turbine further comprises a dynamical brake, such as an electrical brake chopper.

Thereby the wind turbine has additional means to handle a low voltage event.

Thereby the wind turbine can have standard means of protection, control and procedures, but with smaller elements such as the dump resistor and auxiliary brake chopper components.

An object of the invention is achieved according to a method for controlling a wind turbine with a pitch system for pitching a blade in a pitch angle and with blades with an additional mass for increased inertia, which wind turbine is operated in a normal operation mode in which a generator has a generator speed at a generator torque, and which wind turbine is to remain electrically coupled to a grid during a low voltage condition and with supplied current specifications, torque reference, power reference or according to a grid code; the method comprising the steps of:

detecting a low voltage condition with voltage detection means, which voltage detection means after detecting a low voltage condition send a request for:

a rotor de-rate procedure in a wind turbine controller; which de-rate procedure includes:

LVRT pitching the rotor blades to an LVRT pitch angle;

detecting a normal voltage condition with voltage detection means, which normal voltage condition is within a voltage range of the normal voltage condition; which voltage detection means after detecting a normal voltage condition send a request for:

normal operation mode of the wind turbine; which normal operation mode has an initial phase where:

the generator torque or power is increased to a desired torque reference, and pitching the rotor blades from the LVRT pitch angle to a normal or freely controlled pitch angle.

By de-rating, it is understood that the rotor speed is reduced to avoid over speeding.

As such, de-rating is is decelerating to decrease the rotor speed, and in particular, to avoid over speeding.

Contrary to prior art where a brake is used to increase the torque on the shaft, the de-rating according to the invention is due to the increased inertia of the blades.

The LVRT (low voltage ride through) method prevents the rotor blades of the wind turbine to over speed during the low voltage condition. This allows the generator of the wind turbine to remain connected to the grid during a low voltage condition.

As a consequence and compared to prior art, where wind turbines use that blades are designed to be as light as possible and grid faults are handled by a brake chopper, a turbine according to the invention is a wind turbine where the brake chopper is redundant, and consequently a wind turbine can be produced with fewer elements at lower costs during production as well as operation.

According to an embodiment of the invention, a method for controlling a wind turbine is special in that it includes a step, wherein the LVRT pitching of the rotor blades to an LVRT pitch angle is performed at a speed of between 2 to 10 deg/sec, and preferably at a speed of 5 deg/sec; during which initial period the generator speed will increase about 10-20% and a maximum of 30%; and thereafter start to decrease.

Thereby the wind turbine will be able in a controlled way and without large mechanical loads to be controlled in such a way that the rotor speed will de-rate or decrease speed. In this embodiment the rotor speed will de-rate without the forces from a brake system or a brake chopper.

According to an embodiment of the invention, a method for controlling a wind turbine is special in that it includes a step, wherein the control of supply of active and reactive currents in the generator is regulated according to supplied current specifications, torque references, power references, or from a grid code.

Thereby the wind turbine will be able to operate according to grid codes and in a particular a specific grid code.

One such specific grid code is the E.ON. Netz, Grid Code; High and Extra High Voltage (2006) by E.ON. Netz GmH, Bayreuth.

It is understood that a person skilled in the art adjusts the settings to meet the standards given by design and specifications in such grid codes that are hereby incorporated by reference.

In particular the person skilled in the art is drawn to sections regarding requirements to active and reactive power. For the E.ON. grid code this could be section 3.2.4 and for faults on the grid section 3.2.6.2, but not limited hereto.

According to an embodiment of the invention, a method for controlling a wind turbine is special in that it includes a step, wherein the detection of a normal voltage condition with voltage detection means is when said normal voltage condition is within a voltage range of the normal voltage condition. The normal voltage condition can be determined as being between a Low Voltage threshold and a High Voltage threshold.

Thereby a normal voltage condition can be determined. Furthermore, the normal condition can be adjusted according to requirements of a different grid codes or different sections or requirement of a particular grid code.

The normal voltage condition, and the abnormal voltage condition such as a low voltage event, is determined by the RMS or a Positive Sequence of the voltage.

Similarly a normal or abnormal voltage condition can be detected by voltage condition means that measure gradients, spikes or other abnormal voltage events, such as drifts and phase changes.

The voltage condition means can be based on either or combinations of one, two, or three phase detection.

According to an embodiment of the invention, a method for controlling a wind turbine is special in that it includes a step, wherein the voltage detection means after detecting a normal voltage condition send a request for pitching the rotor blades from the LVRT pitch angle to a normal or freely controlled pitch angle and preferably at a pitching speed of less than 5 deg/sec.

Thereby the wind turbine is regulated back to normal operation without undue mechanical loads on the wind turbine.

By normal or freely controlled pitch angle control is understood, that the LVRT or fault control or procedures are not controlling the wind turbine. It is understood that other normal controls, main controls or power optimising, load minimising controls do the control of the wind turbine.

The invention will be described in relation to the drawings and figures, wherein

DETAILED DESCRIPTION OF THE INVENTION

Figure 1:
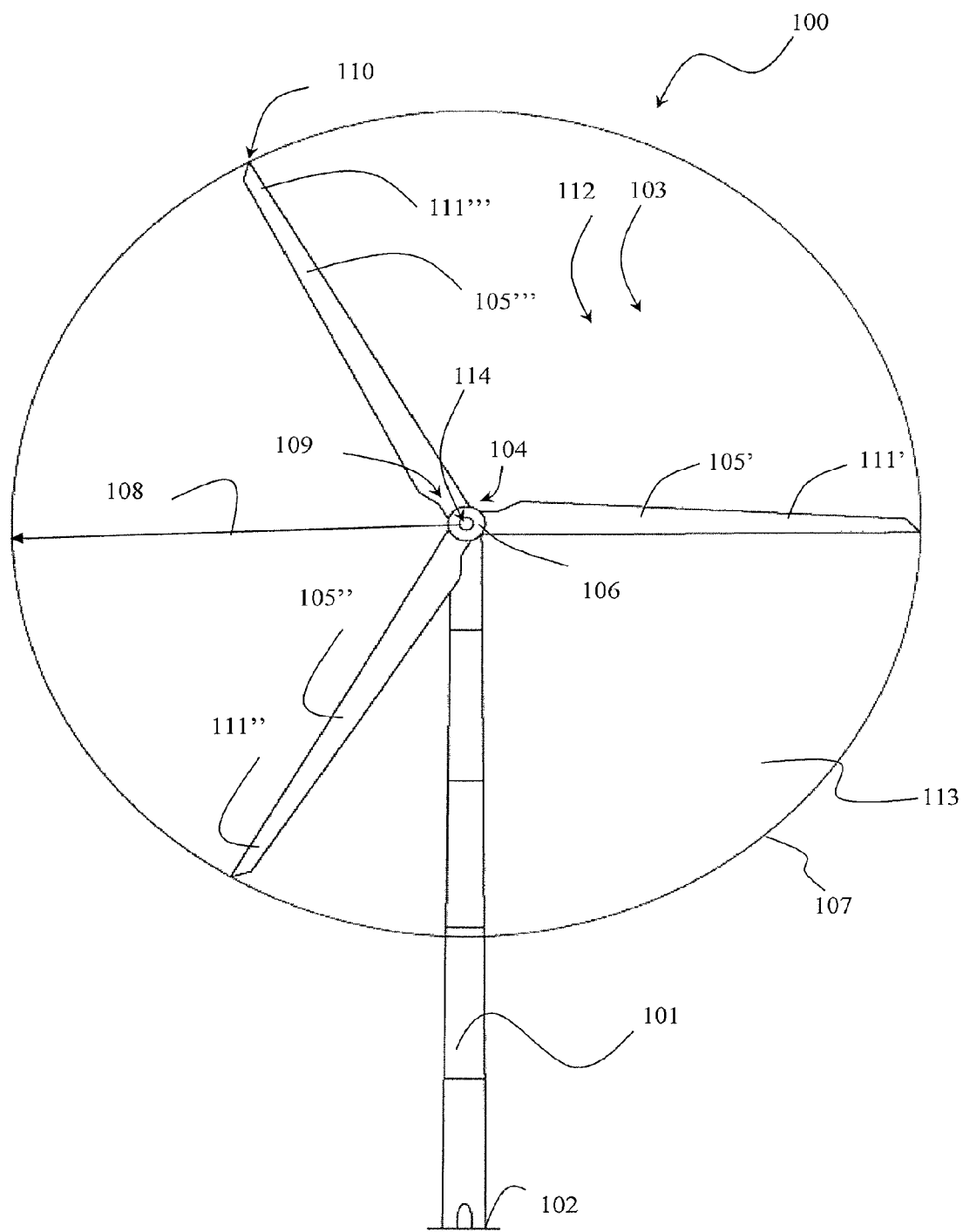
FIG. 1 shows a slim designed three bladed wind turbine.

FIG. 1 shows a general wind turbine 100. The wind turbine 100 has a tower 101 that is configured to raise from a foundation 102 and which tower 101 has a nacelle 103 mounted. The wind turbine 101 has a rotor 104 with at least one blade 105, in this case three blades 105', 105", 105'''. The rotor 104 includes the blades 105 that are mounted in a hub 106, so that the rotor 104 can rotate and circumscribe a rotor circle 107 with a rotor radius that is equivalent to the blade lengths 108.

Each blade 105 has a mounted end 109 or an inner end for mounting the blade 105 at the hub 106 and opposite a free end 110 or an outer end.

Each blade has a blade weight 111. The sum of the blade weights 111', 111", . . . add up to a rotor weight 112.

The rotor 104 rotates in a rotational plane 113 around an axis 114, that is extended in a shaft 115 (not shown in this figure) connected to a generator 116 (not shown in this figure).

Figure 2:
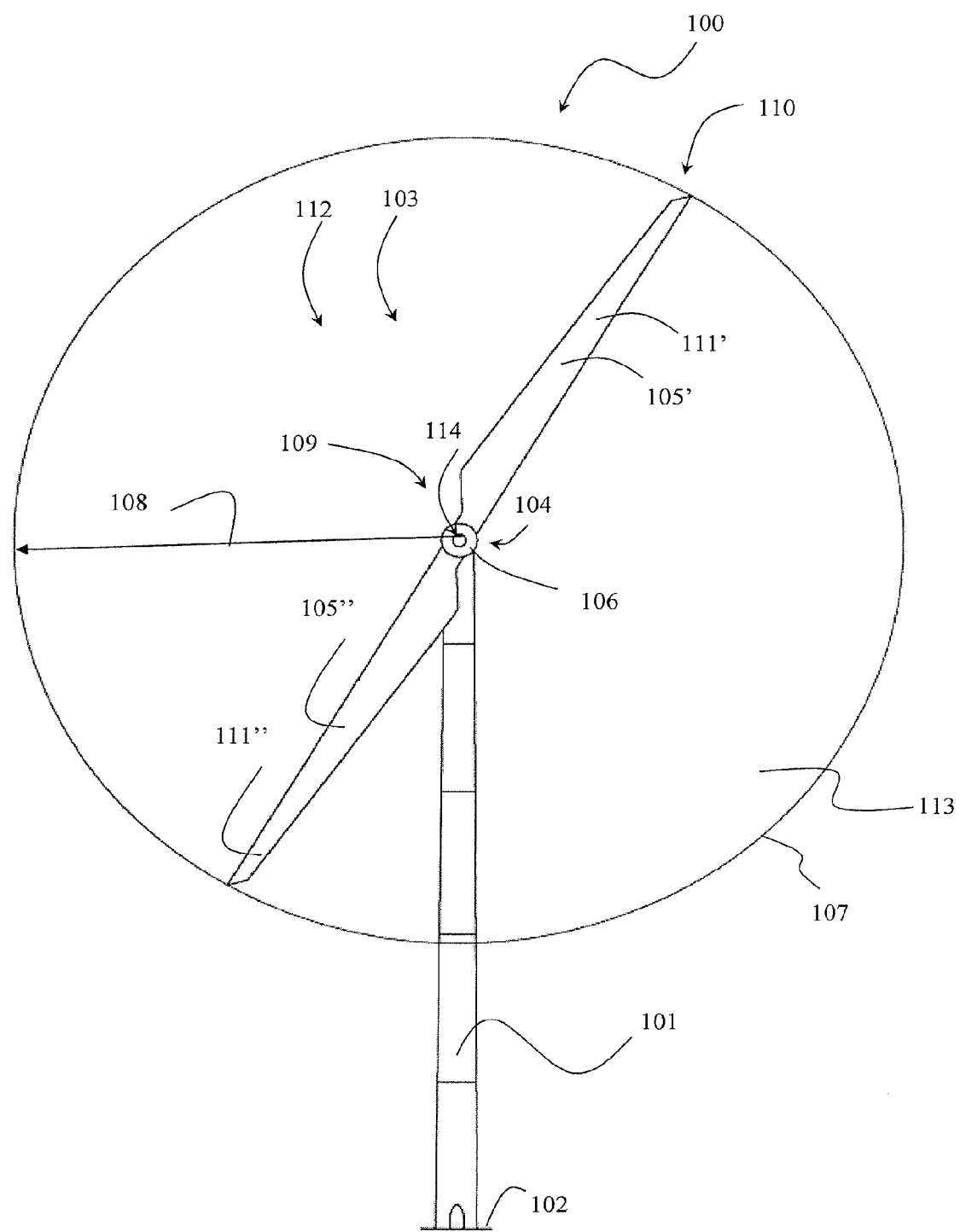
FIG. 2 shows a slim designed two bladed wind turbine.

FIG. 2 shows a slim designed two bladed (105', 105") wind turbine (100) with references from FIG. 1.

Figure 3:
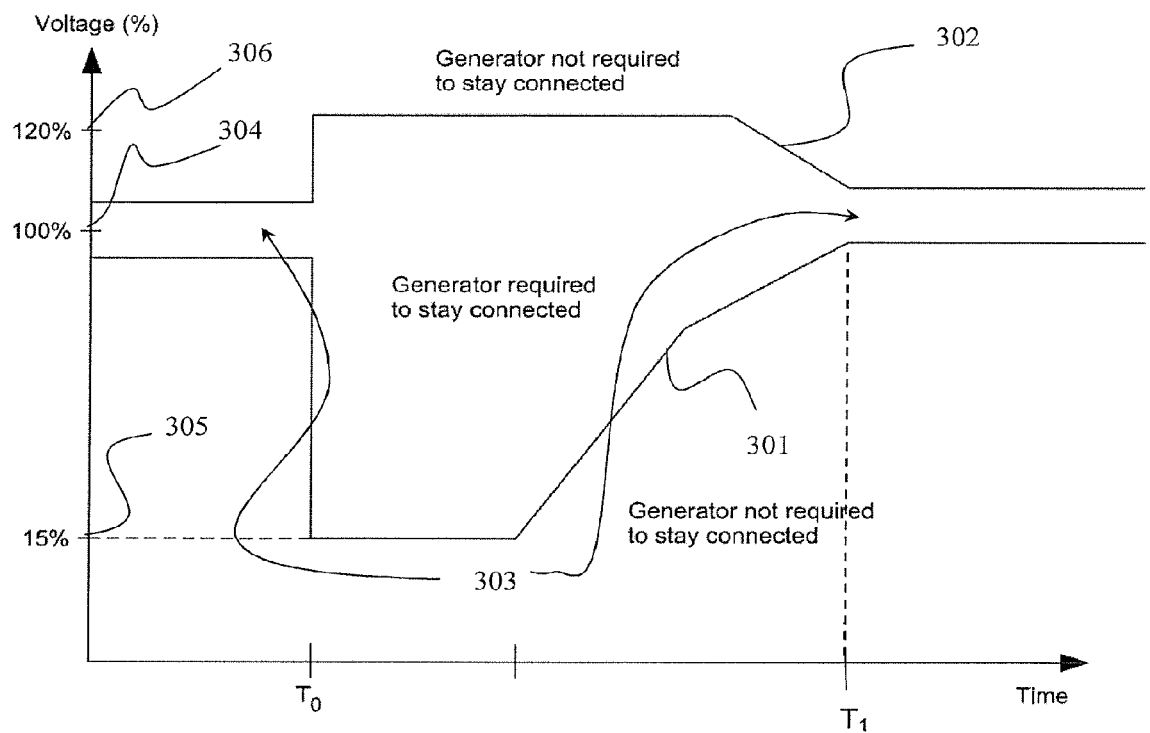
FIG. 3 shows a graph of a low voltage event with voltage against time.

FIG. 3 shows a graph of examples of fault events where the voltage is plotted against time.

There is an example of a low voltage ride through (LVRT) event 301 and an example of a high voltage ride through (HVRT) event 302. The LVRT event 301 and the HVRT event 302 separate a normal voltage event 303 defined as +/− a certain percent from a normal voltage 304 indicated as 100%. The onset time $T_0$ is where the LVRT event 301 or the HVRT event 302 begins. The end time $T_1$ is the end of both events and here shown for the LVRT event 301.

The LVRT event 301 ends when the voltage is within the normal voltage range.

The low voltage (LV) threshold 305 is here 15% of the normal voltage 304, and the high voltage (HV) threshold 306 is here 120% of the normal voltage 304.

Figure 4:
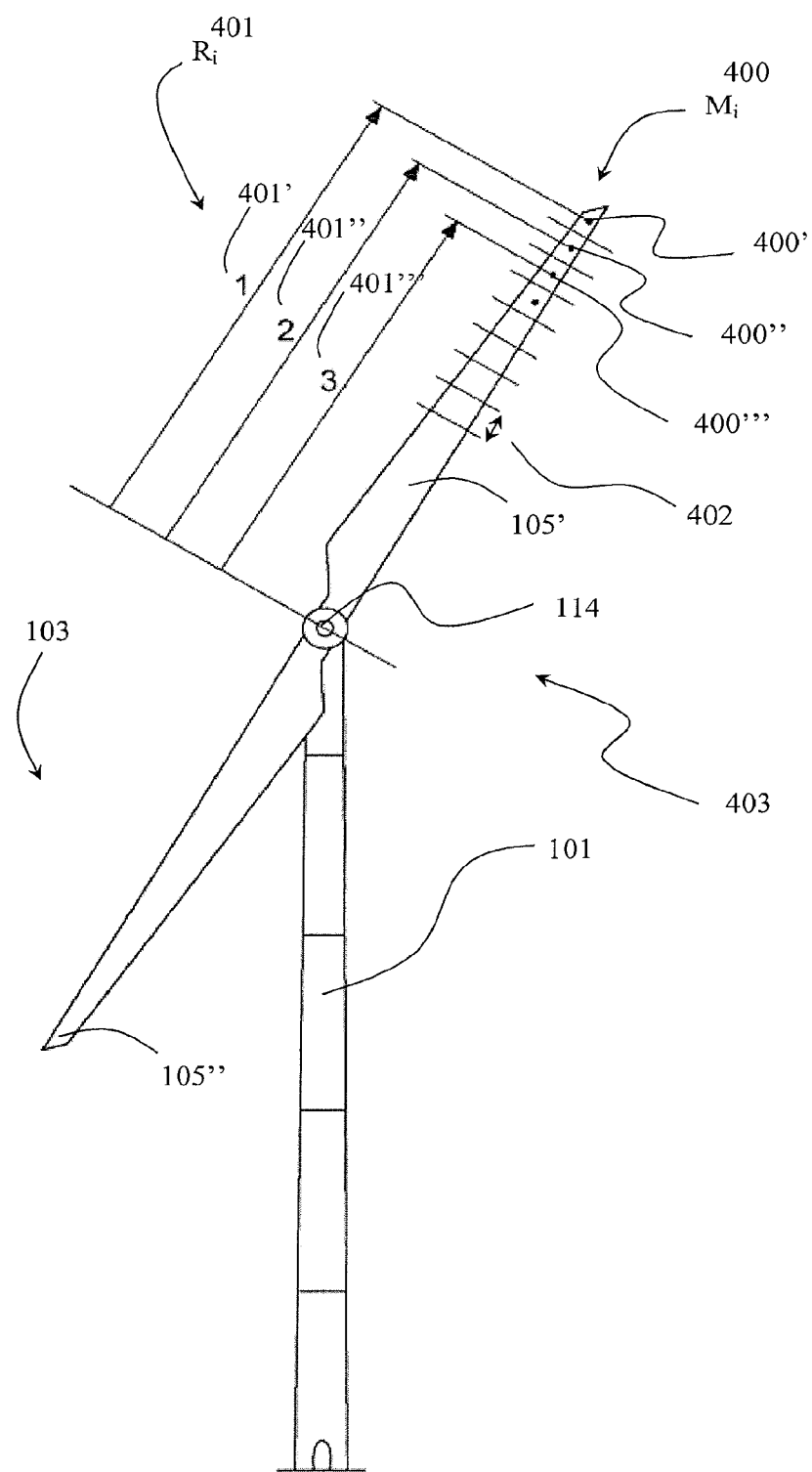
FIG. 4 shows a two bladed wind turbine with loads placed in different distances from the axle or rotational shaft.

FIG. 4 shows a two bladed 105 wind turbine 100 with masses 400, placed in different distances or radii, $R_i$ 401 from the axis 114. These masses are distinct masses 400 and additional masses that from a purely aerodynamically and mechanical load point of views would not be there. These masses 400 do technically contribute to increase the moment of inertia 403 of the rotor 104.

In this embodiment a first mass 400' is placed at first radii 401'. A second mass 400" is placed at second radii 401". A third mass 400''' is placed at third radii 401'''. Likewise more masses 400 or sub-masses 400' can be placed at different radii, and at different intervals D 402, individually to contribute to the moment of inertia 403 of the rotor 104.

It is understood that there are means for holding each mass 400 at a particular position on each blade 105. Furthermore, there can be means for adjusting the position of the centre of gravity of each mass 400 thereby adjusting the radii 401, so that the masses 400 on each blade 105 can be balanced, so that the rotor 104 has a centre of gravity of the masses 400 in their projection onto the rotational plane of the rotor 104 that coincides with the axis 114.

It is further understood that if the blades 105', 105" differ and have an off-axis centre of gravity, then the masses 400 can be distributed on the blades 105', 105" to balance or re-balance, so that the centre of gravity of the blades 105', 105" and the masses 400', 400", . . . have a projection onto the rotational plane of the rotor 104 that coincides with the axis 114.

Figure 5:
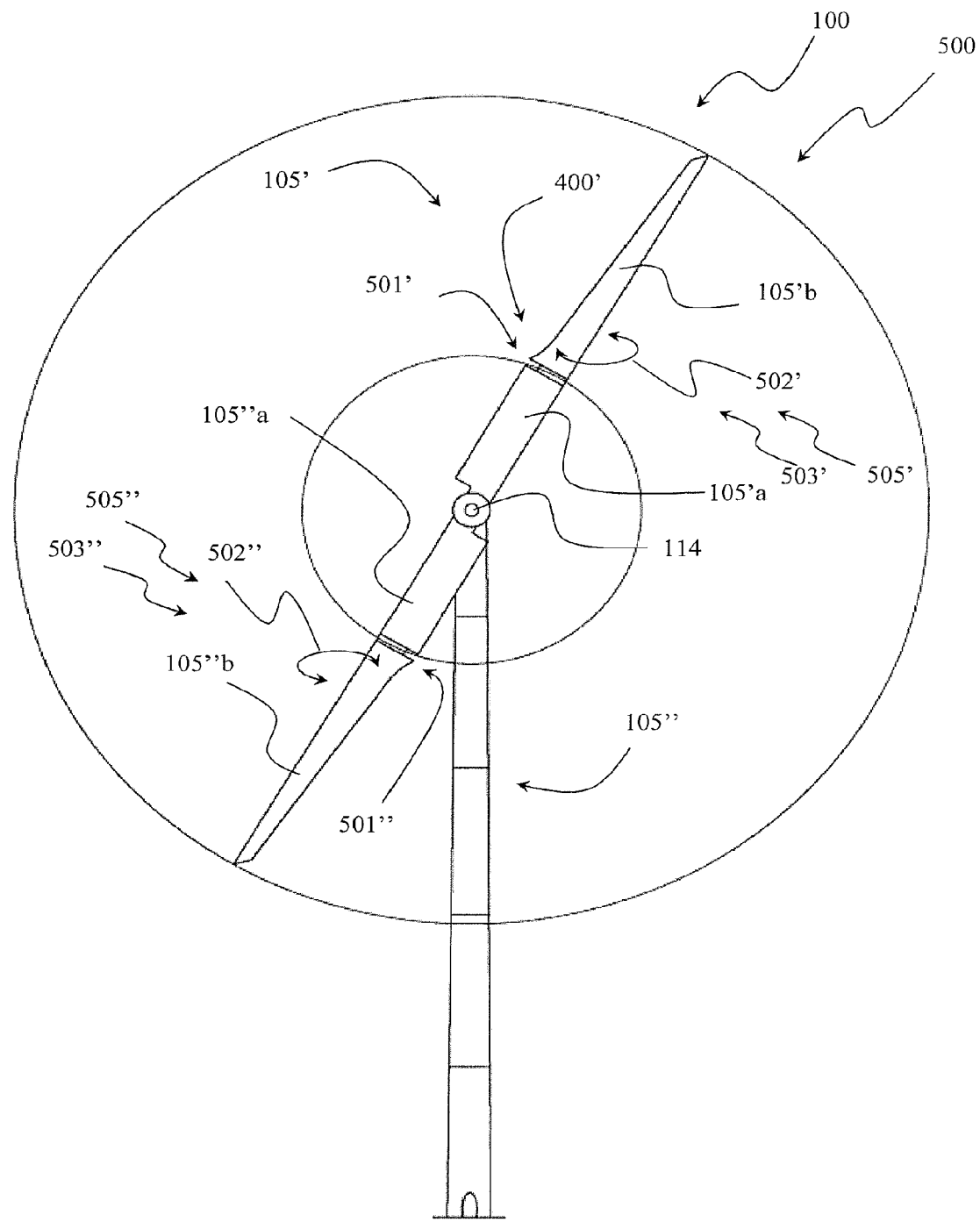
FIG. 5 shows a two bladed partial pitch wind turbine with masses placed as the pitching system.

FIG. 5 shows a two bladed partial pitch wind turbine 500 with masses 400 according to the invention and FIG. 4. Each mass 400 include at least the pitching system 501, but can be extended by additional sub-masses 400' to add up to a mass 400.

A blade 105 on a partial pitch wind turbine 500 comprises an inner blade section 105a towards the hub 106 and an outer blade section 105b towards the outer end 110.

The inner blade section 105a and the outer blade section 105b is parted by the pitching system 501. On the two bladed partial pitch wind turbine 500 shown in this embodiment, each blade 105', 105" has an inner blade section 105'*a*, 105"*a* and an outer blade section 105'*b*, 105"*b* divided by a partial pitching system 501', 501".

Each outer blade section 105*b* can rotate relatively to the inner blade section 105*a* by the pitching system 501; that is to pitch in a pitching angle 502.

The pitching angle 502 can have a normal pitching angle 503, which is variable according to the actual control of the blade 105 and the control of the wind turbine 100. As such the normal pitching angle 503 is a result of operating the pitch wind turbine in a normal operation mode 504 (not shown on the figure) or state. The normal operating mode 504 is when the wind turbine 100 operates or rotates when the normal voltage event 303 is present.

Likewise, the pitching angle 502 can have an LVRT pitching angle 505, which is variable, but primarily an extreme angle or a fixed angle according to the actual control of the blade 105 and the control of the wind turbine 100. As such the LVRT pitching angle 505 is a result of operating the pitch wind turbine in an LVRT operation mode 506 (not shown on the figure) or state.

The LVRT operation mode 506 or state is when the wind turbine 100 operates or rotates when the LVRT-event 301 is present.

Figure 6:
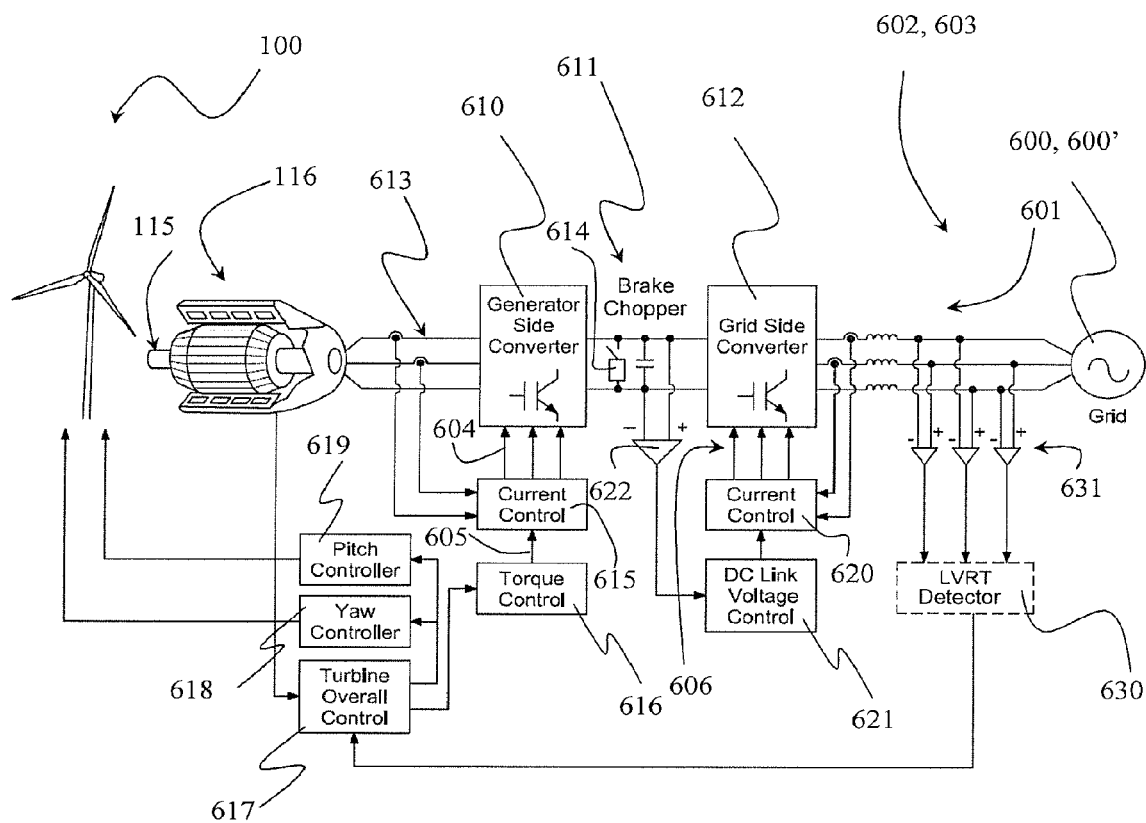
FIG. 6 shows a schematic diagram of components connecting the wind turbine structure with the grid.

FIG. 6 shows a schematic diagram of components connecting the wind turbine 100 structure with a grid 600.

The grid 600 is a coupled network for transmitting power between power sources and power sinks that are interconnected and each linked to the grid by a grid connection.

Conditions to stay connected to the gird are defined by a grid code 600'.

One such grid 600 with a grid code 600' is the E.ON. Netz, Grid Code; High and Extra High Voltage (2006) by E.ON. Netz GmH, Bayreuth.

Between the generator 116 of the wind turbine 100 and the grid 600 there is a grid connection 601.

In this embodiment and from the generator 116 towards the grid 600 side there is generator connector 613, a generator side converter 610, a brake chopper 611, and a grid side connector 601 connecting the generator 116 of the wind turbine 100 to the grid 600 via appropriate cables, being AC or DC cables as required.

In this embodiment the generator side converter 610 is an AC/DC-converter, and the grid side converter 612 is a DC/AC-converter.

In between the generator side converter 610 and the grid side converter 612 there is a brake chopper 611 or just a brake, a dynamic brake, which in the shown embodiment consists of a dump load resistor 614, which can be combined, as is here shown, with capacitors and contacts/switches.

The generator side converter 610 is controlled by a current controller 615 with input from the output of the generator 116 and from the torque controller 616.

The torque controller 616 is controlled by an overall controller 617 receiving input from at least the generator 116. The overall controller 617 further controls a yaw controller 618 and a pitch controller 619. The yaw controller 618 controls the wind turbine 100 as does the pitch controller 619.

The grid side converter 612 is controlled by a grid side current controller 620 with input from at least the grid 600 and a DC link Voltage controller 621, which again receives input from a DC comparator 622.

In an embodiment there is further a LVRT detector 630 receiving input from the grid 600 by means of AC comparator 631.

Figure 7:
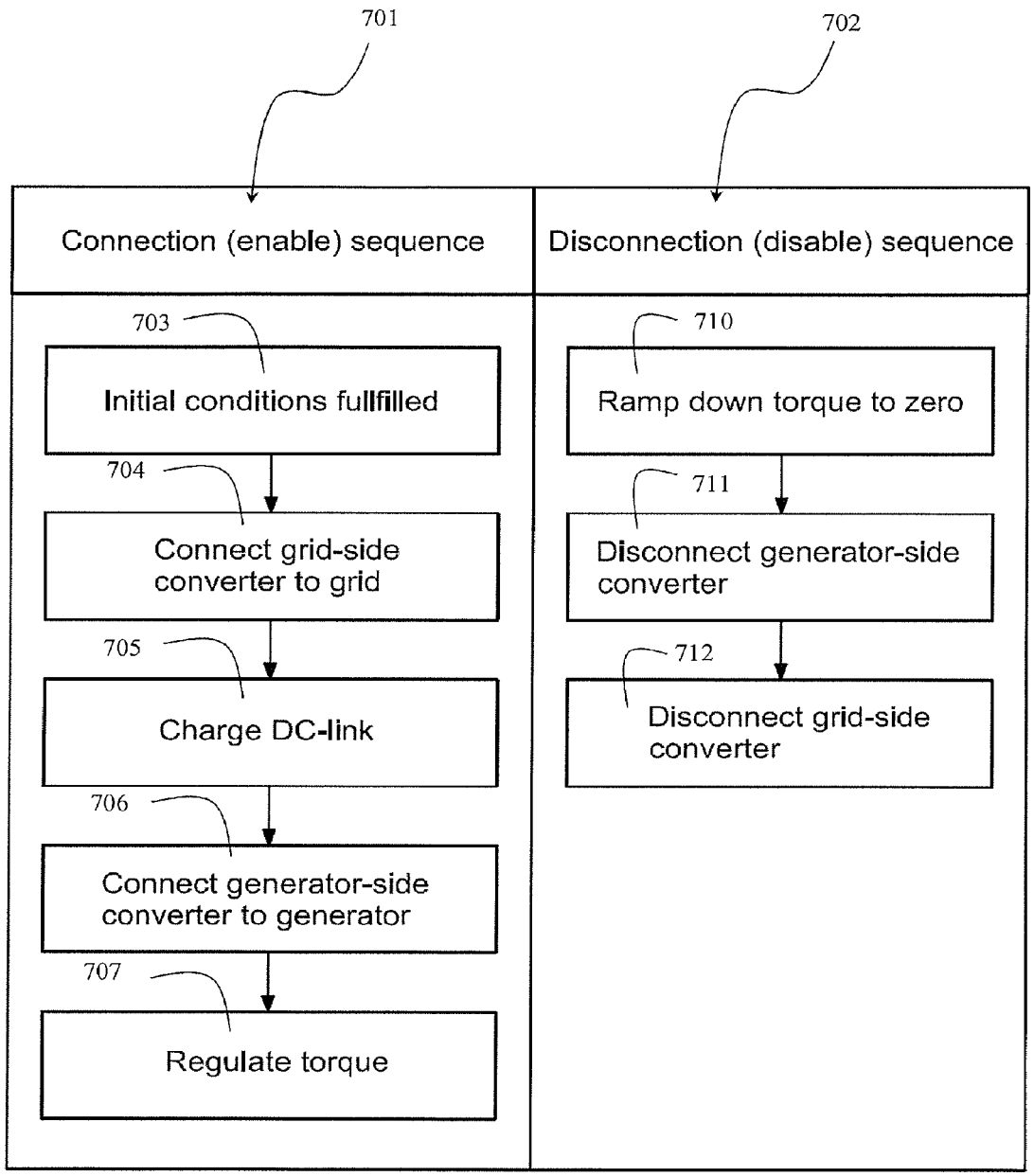
FIG. 7 shows a connection or enabling sequence and a disconnecting or disabling sequence.

FIG. 7 shows a connection or an enable sequence 701 and a disconnecting or disable sequence 702.

The connection sequence 701 has an initial condition step 703, where data for determining, if the initial conditions are fulfilled, are collected and compared. This is followed by a connect grid-side step 704, in which the grid side converter 612 is connected to the grid 600. This is followed by a charge step 705, during which capacitors are charged. This is followed by a connect generator side step 706, during which the generator side converter connects to the generator 116 in the wind turbine 100.

This is followed by a regulate torque step 707, during which the torque is regulated.

The disconnection sequence 702 has a ramp down torque step 710. This is followed by a disconnect generator side step 711, during which the generator 116 is disconnected. This is followed by a disconnect grid side step 712, during which the grid side converter 612 is disconnected from the grid 600.

Figure 8:
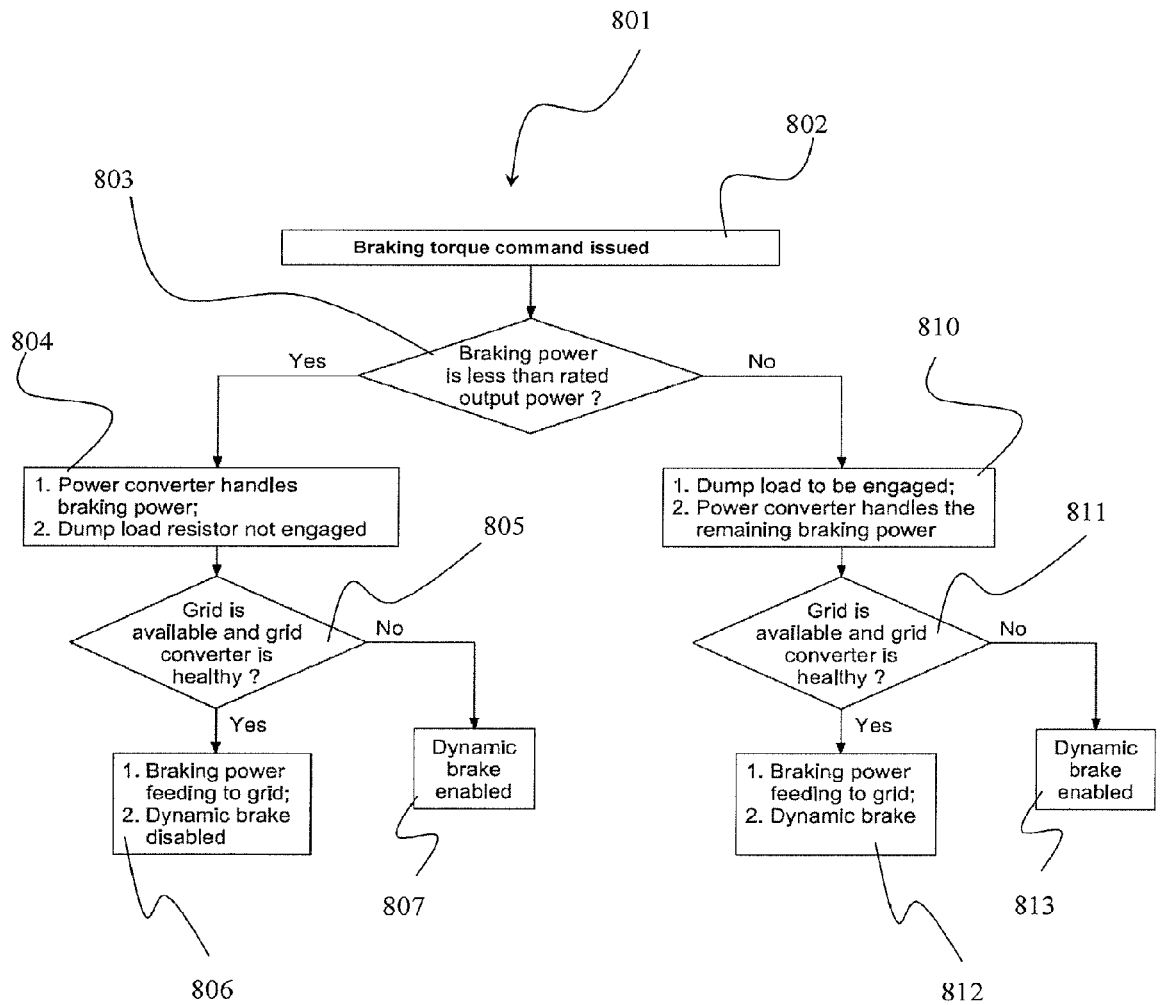
FIG. 8 shows a schematic flow-diagram for handling braking torque.

FIG. 8 shows a schematic flow-diagram for handling braking torque, a braking torque controller 801.

This illustrates how the dynamic brake such as a brake chopper is controlled in the case when there is a dynamic brake such as a brake chopper of a reduced sized used in a wind turbine having additional masses or a rotor with an increased inertia as compared to a wind turbine with a rotor that is designed with a low or normal rotational inertia.

The braking torque flow diagram 801 begins with a braking torque issued routines 802 handling the initialisation and controls the state when a braking torque command has been issued.

This is followed by a braking torque detection and decision routines 803, which routines determines if the braking power is less than rated output power.

In the case of a positive answer during the braking torque detection and decision routines 803, the braking torque controller 801 enters a power converter handler routine 804. These routines essentially activate that the power converter handles the braking power and that the dump load resistor is not engaged.

This is followed by a first grid status detection and decision routines 805, which routines essentially detect, receive, and/or determine the status of the grid 600. The grid status detection and decision routines 805 determine if the grid 600 is available and if the grid converter is healthy.

In the case of a positive answer to the grid status detection and decision routines 805, the braking torque controller 801 enters a first feeding braking power routines 806. In case of a negative answer, the braking torque controller 801 enters a first dynamic brake routines 807.

The first braking power routines 806 controls the feeding of braking power to the grid 600 and that the dynamic brake is disabled.

The first dynamic brake routines 807 is enabled.

In the case of a negative answer during the braking torque detection and decision routines 803, the braking torque controller 801 enters a dump load routines 810.

The dump load routine 810 ensures that the dump load is engaged and that the power converter handles the remaining braking power.

This is followed by second grid status detection and decision routines 811, and subordinated a second feeding braking power routines 812, and second dynamic brake routines 813.

In an embodiment the first and second grid status detection and decision routines 805, 811 are identical. In another embodiment they are variants. Likewise for the first and second feeding braking power routines 806, 812 and the first and second dynamic brake routines 807, 813.

Figure 9:
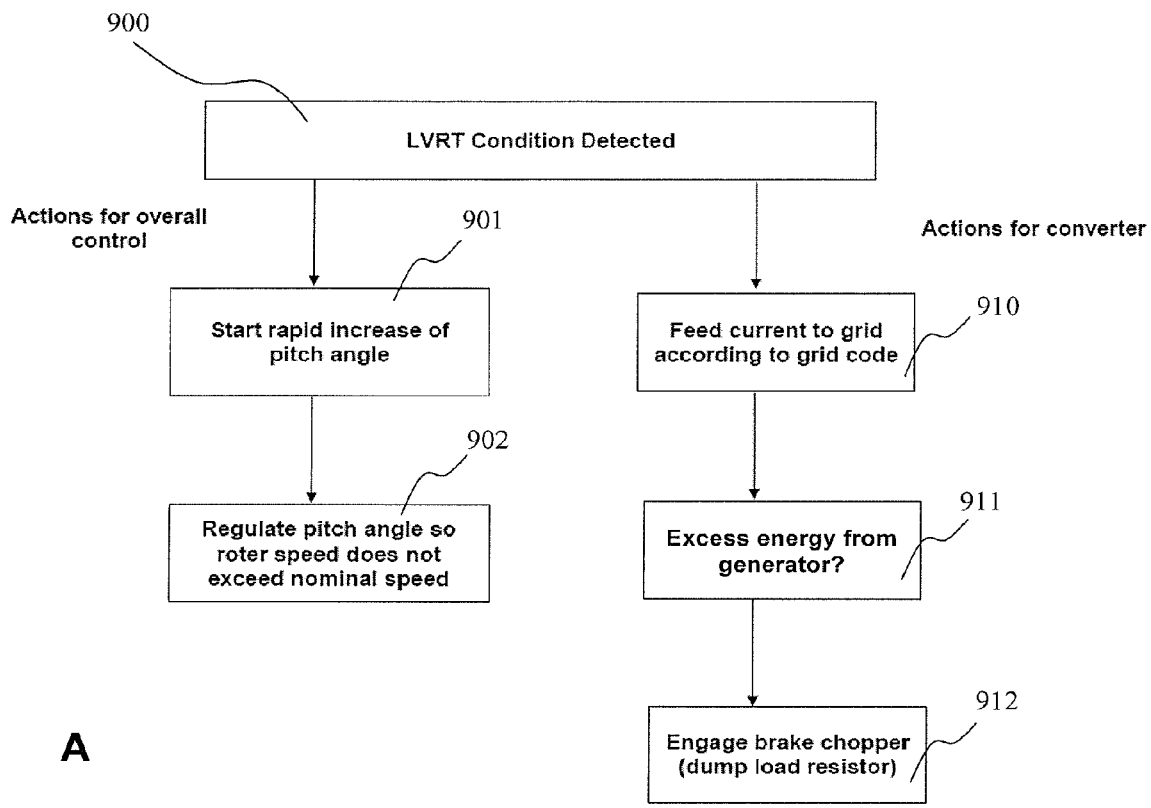
FIG. 9 shows a schematic flow-diagram for handling a LVRT in Prior Art and for handling a LVRT, according to the invention.
Figure 9:
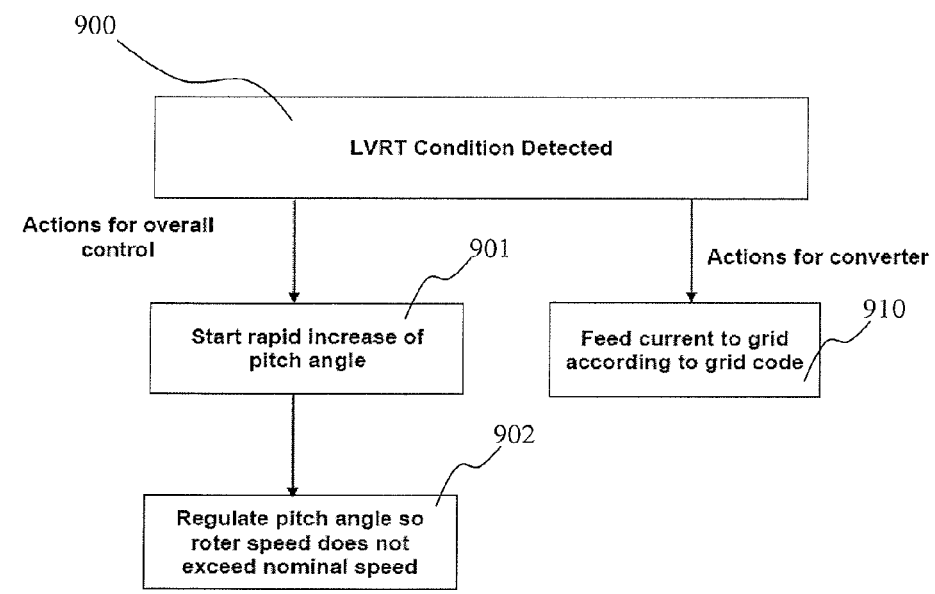

FIG. 9 shows a schematic flow-diagram for handling a LVRT in Prior Art and for handling a LVRT according to the invention.

The A-part shows a simplified schematic of the Prior Art when a LVRT condition 900 is detected. The LVRT condition 900 triggers actions for the overall wind turbine control and actions for the converter.

The actions for the over all wind turbine control includes a routine that starts a rapid increase of the pitch angle 901 followed by a routine that regulates the pitch angle so that the rotor speed does not exceed the nominal speed 902.

The action for the converter includes a routine that feed current to the grid according to the grid code 910, followed by routines that monitor if there is excess energy from the generator 911, and that is the case routines that engage the brake chopper 912 which bums energy in the dump load resistor 614.

The B-part shows a simplified schematic according to the invention and for direct comparison with the A-part. The routines 901, 902 for the overall wind turbine control are the same as in the Prior Art in part A.

Similarly the B-part includes a routine that feed current to the grid according to the grid code 910.

A distinguishing feature is that there is no need for the routines 911, 912 that monitor the excess energy 911 nor the routine that engages the brake chopper 912.

EXAMPLE

To illustrate the effect of the invention as disclosed, three wind turbines in the 3.6 MW class are compared. All three wind turbines have a rotor diameter of 128 m (approximately a blade length of 64 m).

The first wind turbine is a three bladed active pitch turbine as illustrated in FIG. 1. A blade for this type of wind turbine will have a weight of about 11,000 kg.

The second wind turbine is a two bladed active pitch turbine as illustrated in FIG. 2. A blade for this type of wind turbine will have a weight of about 23,000 kg.

The third wind turbine is a two bladed partial pitch turbine as illustrated in FIG. 5. This is a special embodiment of the disclosure illustrated in FIG. 4. A blade for this third type of wind turbine will have a weight of about 23,000 kg and a pitching system, or pitch bearing, of about 5,000 kg placed at a radius of about 20 m from the axis.

| Type | Blade | Weight | Moment of Inertia [kgm$^2$] |
|---|---|---|---|
| 1 | Three blade, active pitch | 11,000 kg | $21 \times 10^6$ |
| 2 | Two blade, active pitch | 23,000 kg | $14 \times 10^6$ |
| 3 | Two blade, partial pitch | 23,000 kg + 5,000 kg at 20 m | $37 \times 10^6$ |

It is clear that the rotor moment of inertia of the third type of wind turbine is larger than for the first and the second type. Therefore, the rotor of the third wind turbine type will, all things equal, not accelerate towards or to a maximum rotor speed during a grid faults, such as a low voltage conditions. On this basis it has been found, that a wind turbine of this third type will not need a brake chopper or any other brake system.

As such a wind turbine with two partial pitch blades without a brake chopper has been realised according to this invention.

Likewise methods for controlling such wind turbine and without the control for the brake chopper have been realised according to this invention.

| No | Part |
|---|---|
| 100 | Wind turbine |
| 101 | Tower |
| 102 | Foundation |
| 103 | Nacelle |
| 104 | Rotor |
| 105 | Blade |
| 106 | Hub |
| 107 | Rotor Circle |
| 108 | Blade length/rotor radius |
| 109 | Mounted end/inner end |
| 110 | Free end/outer end |
| 111 | Blade weight |
| 112 | Rotor weight |
| 113 | Rotational plane |
| 114 | Axis |
| 115 | Shaft |
| 116 | Generator |
| 301 | LVRT event |
| 302 | HVRT event |
| 303 | Normal voltage event |
| 304 | Normal Voltage (Rated Voltage). |
| 305 | LV threshold |
| 306 | HV threshold |
| 400 | Mass, $M_i$ |
| 401 | Radius, $R_i$ |
| 402 | Interval, D |
| 403 | Moment of inertia, IM |
| 500 | Partial pitch Wind turbine |
| 501 | Pitching system |
| 502 | Pitching angle |
| 503 | Normal pitching angle |
| 504 | Normal operation mode |
| 505 | LVRT pitching angle |
| 506 | LVRT operation mode |
| 600 | Grid |
| 600' | Grid Code |
| 601 | Grid Connection |
| 602 | Normal voltage condition |
| 603 | Low voltage condition (LV) |
| 604 | Current specifications |
| 605 | Torque reference |
| 606 | Current specifications |
| 610 | Generator side converter |
| 611 | Brake Chopper [Dynamic Brake, Brake], |
| 612 | Grid side converter |
| 613 | Generator connection |
| 614 | Dump Load Resistor |
| 615 | Generator side current control |
| 616 | Torque controller |
| 617 | Overall controller |
| 618 | Yaw controller |
| 619 | Pitch controller |
| 620 | Grid side current control |
| 621 | DC Link Voltage Control |
| 622 | DC comparator |
| 630 | LVRT detector |
| 631 | AC comparator |
| 701 | Connection sequence |
| 702 | Disconnection sequence |
| 703 | Initial condition step |
| 704 | Connect grid-side step |
| 705 | Charge step |
| 706 | Connect generator side step |
| 707 | Regulate torque step |
| 710 | Ramp down torque step |
| 711 | Disconnect generator side step |
| 712 | Disconnect grid side step |
| 801 | Braking torque controller |
| 802 | Braking torque issued routines |
| 803 | Braking torque detection and decision routines |
| 804 | Power converter handler routines |
| 805 | First grid status detection and decision routines |
| 806 | First feeding braking power routines |
| 807 | First Dynamic brake routines |
| 810 | Dump load routines |
| 811 | Second grid status detection and decision routines |
| 812 | Second feeding braking power routines |
| 813 | Second dynamic brake routines |
| 900 | LVRT condition |

-continued

| No | Part |
|---|---|
| 901 | Rapid increase of pitch angle routines |
| 902 | Regulate pitch angle routines |
| 910 | Feed current according to grid code routines |
| 911 | Monitor if excess energy from generator routines |
| 912 | Engage Brake Chopper routines |

What is claimed is:

1. A wind turbine comprising:
a wind turbine tower with an upper end and a lower end, which lower end is provided on a wind turbine foundation;
a wind turbine nacelle provided at the upper end of said tower;
a hub provided at said nacelle;
at least two wind turbine rotor blades each with a mounting end and a free end, which mounting end is mounted on the hub for rotation in a rotational plane around an axis that is extended by shaft coupled to a generator or a gearbox;
grid connection for feeding produced electricity from the generator to a grid, which grid connection has voltage detection means for detecting changes in the voltage on the grid;
at least two masses each placed between the mounting end and the free end of each rotor blade, wherein said wind turbine rotor blades each has a blade weight and a blade length of at least 35 meters between the mounting end and the free end, where each mass is between 10% and 40% of blade weight of each rotor blade; where
the rotor blade has an inner blade section and an outer blade section separated by a pitching system, that is located between the mounting end and the free end and configured to pitch the outer blade section relative to the inner blade section, where a weight and radial extend of one of the masses are formed by at least the weight and radial extend of the pitching system.

2. A wind turbine according to claim 1, wherein said masses are placed with a centre of gravity that projected onto the rotational plane coincides with the axis.

3. A wind turbine according to claim 1, wherein each rotor blade is configured to receive a variable mass, so that the moment of inertia of the rotor can be varied and matched to handle LV-events according to different grid codes.

4. A wind turbine according to claim 1, wherein each mass radial extends no more than 10% of the blade length of each rotor blade, preferably no more than 5%.

5. A wind turbine according to claim 1, wherein further to the pitching system; at least an additional sub-mass is placed in the rotor blade to constitute a total mass.

6. A wind turbine according to claim 1, wherein the wind turbine further comprises a dynamical brake, such as an electrical brake chopper.

7. A method for controlling a wind turbine, according to claim 1, with a pitch system for pitching a blade in a pitch angle and with blades with an additional mass for increased inertia, which wind turbine is operated in a normal operation mode in which a generator has a generator speed at a generator torque, and which wind turbine is to remain electrically coupled to a grid during a low voltage condition and with supplied current specifications, torque reference, power reference or according to a grid code; wherein the method comprises the steps of:
detecting a low voltage condition with voltage detection means, which voltage detection means after detecting a low voltage condition send a request for:
a rotor de-rate procedure in a wind turbine controller; which de-rate procedure includes:
LVRT pitching the rotor blades to an LVRT pitch angle;
detecting a normal voltage condition with voltage detection means, which normal voltage condition is within a voltage range of the normal voltage condition; which voltage detection means after detecting a normal voltage condition send a request for:
normal operation mode of the wind turbine; which normal operation mode has an initial phase where:
the generator torque or power is increased to a desired torque reference or power reference, and
pitching the rotor blades from the LVRT pitch angle to a normal or freely controlled pitch angle.

8. A method for controlling a wind turbine according to claim 7, wherein the LVRT pitching of the rotor blades to an LVRT pitch angle is performed at a speed of between 2 to 10 deg/sec, and preferably at a speed of 5 deg/sec; during which initial period the generator speed will increase about 10-20% and a maximum of 30%; and thereafter start to decrease.

9. A method for controlling a wind turbine according to claim 7, wherein the control of supply of active and reactive currents in the generator is regulated according to supplied current specifications or torque references from a grid code.

10. A method for controlling a wind turbine according to claim 7, wherein the detection of a normal voltage condition with voltage detection means is when said normal voltage condition is within a voltage range of the normal voltage condition.

11. A method for controlling a wind turbine according to claim 7, wherein the voltage detection means after detecting a normal voltage condition send a request for pitching the rotor blades from the LVRT pitch angle to a normal or freely controlled pitch angle and preferably at a pitching speed of less than 5 deg/sec.

* * * * *